United States Patent [19]

Lantzsch et al.

[11] 4,089,841

[45] May 16, 1978

[54] THIAZOLINYLAMINO-PIPERIDINE DERIVATIVES

[75] Inventors: Reinhard Lantzsch; Paul Uhrhan, both of Cologne; Harald Oertel; Ernst Roos, both of Odenthal; Dieter Arlt, Cologne, all of Germany

[73] Assignee: Bayer AG, Leverkusen, Germany

[21] Appl. No.: 730,203

[22] Filed: Oct. 6, 1976

[30] Foreign Application Priority Data

Oct. 11, 1975 Germany .............................. 2545645

[51] Int. Cl.² .......................................... C07D 419/12
[52] U.S. Cl. ...................... 260/45.8 SN; 260/293.57; 260/293.68

[58] Field of Search .................. 260/45.8 SN, 293.57, 260/293.68, 2.5 BB

[56] References Cited

U.S. PATENT DOCUMENTS

| 3,431,233 | 3/1969 | Murayama et al. ........... 260/45.8 SN |
| 3,829,404 | 8/1974 | Murayama et al. ........... 260/45.8 SN |

*Primary Examiner*—V.P. Hoke
*Attorney, Agent, or Firm*—Connolly and Hutz

[57] ABSTRACT

Thiazolinylamino-piperidine derivatives can be obtained by reacting a β-chloroisothiocyanate with a 4-amino-piperidine. The resulting products can be used as stabilizers for synthetic polymers against discoloration and degradation under the effect of visible and/or UV-light, heat and/or atmospheric influences.

9 Claims, No Drawings

THIAZOLINYLAMINO-PIPERIDINE DERIVATIVES

By virtue of their outstanding properties, the synthetic polymers are widely used, for example as filaments, fibres films, lacquers or sheeting. Unfortunately, one disadvantage of these synthetic polymers is their poor stability to light and heat. Polyolefin, polyamide and polyurethane elastomers, for example, undergo considerable degradation under the effect of light and heat, which is reflected in the loss of their favourable mechanical properties and also in occasionally very considerable discoloration.

Accordingly, a number of different stabilisers, such as for example phenol derivatives, benzophenone compounds or derivatives of benzotriazole, have been proposed for stabilising these synthetic polymers. Unfortunately, these products are not entirely satisfactory.

It has now been found that compounds corresponding to general formula (I) provide synthetic polymers with an excellent degree of protection against degradation.

This invention relates to new thiazolinylamino-piperidine derivatives, to their production and to their use as stabilisers for synthetic polymers. The new compounds are characterised by the following general formula (I):

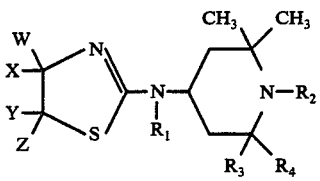

in which
the radicals, W, X, Y and Z are the same or different and each represent H or a straight-chain or branched alkyl radical having 1 to 12 carbon atoms which may optionally be substituted by 1 to 3 chlorine atoms, in addition to which the radicals X and Y may also form with the carbon atoms in the 4 and 5 position of the thiazoline ring a cycloalkyl ring having 5 to 8 or even 12 ring carbon atoms, $R_1$ represents H, a straight-chain or branched alkyl radical having 1 to 20 carbon atoms, a cycloalkyl radical having 5 to 12 carbon atoms, an aralkyl radical having 7 to 12 carbon atoms, a β-cyanoethyl radical, a β-alkoxy carbonyl ethyl radical having 1 to 3 carbon atoms in the alkoxy moiety, an aryl radical having 6 to 14 carbon atoms, the group —CH$_2$—CHR$_5$—OH where R$_5$ represents H, methyl or phenyl, or corresponds to the formula (II):

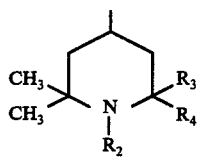

in which
$R_2$ represents H, a straight-chain or branched alkyl radical having 1 to 20 carbon atoms, an alkenyl or alkinyl radical having 3 to 12 carbon atoms, an aralkyl radical having 7 to 12 carbon atoms or the group —CH$_2$—CHR$_5$—OH where R$_5$ represents H, methyl or phenyl, and $R_3$ and $R_4$ are the same or different and each represent a straight-chain or branched alkyl radical having 1 to 12 carbon atoms or together with the ring carbon atom to which they are attached form a cycloalkyl ring having 5 to 12 ring carbon atoms, and $R_2$, $R_3$ and $R_4$ in formula (I) have the same meaning as $R_2$, $R_3$ and $R_4$ in formula (II).

The following are examples of the radicals W, X, Y and Z: H, methyl, ethyl, n-propyl, isopropyl, n-butyl, sec.-butyl, tert.-butyl, n-hexyl, n-octyl, isododecyl, chloromethyl, α-chloroethyl, β-chloroethyl or α,β-dichloroethyl radicals, but preferably an alkyl radical having 1 to 4 carbon atoms which may optionally be substituted by 1 to 2 chlorine atoms. Methyl, ethyl, propyl, chloromethyl and α,β-dichloroethyl radicals are particularly preferred.

Examples of cycloalkyl rings, in which the radicals X and Y together with the carbon atoms in the 4 and 5-position in the thiazoline ring form a cycloalkyl ring, are cyclopentane, cyclohexane, methyl cyclohexane, norbornane, cycloheptane, cyclooctane or cyclododecane rings. Cyclohexane, methyl cyclohexane and norbornane rings are preferred, the cyclohexane ring system being particularly preferred.

The following are examples of the radical $R_1$: H, straight-chain or branched alkyl groups having 1 to 20 carbon atoms, such as methyl, ethyl, n-propyl, isopropyl, n-butyl, sec.-butyl, tert.-butyl, octyl or stearyl; cycloalkyl radicals such as cyclopentyl, cyclohexyl, methyl cyclohexyl or cyclododecyl; aralkyl groups such as benzyl or phenyl ethyl; also the β-cyanoethyl group and alkoxy carbonyl ethyl radicals such as 2-methoxy carbonyl ethyl or 2-isopropoxy carbonyl ethyl; aryl radicals such as phenyl or naphthyl; hydroxy alkyl radicals such as β-hydroxy ethyl, β-hydroxy-β-methyl ethyl and β-hydroxy-β-phenyl ethyl. $R_1$ preferably represents hydrogen, straight-chain or branched alkyl radicals having 1 to 8 carbon atoms, such as methyl, ethyl, n-propyl, isopropyl, n-butyl, sec.-butyl and octyl; also cyclohexyl, methyl cyclohexyl, benzyl, β-cyanoethyl, 2-methoxy carbonyl ethyl and β-hydroxy ethyl. Hydrogen methyl, cyclohexyl, benzyl, β-cyanoethyl and β-hydroxy ethyl are particularly preferred.

The following are examples of the radical $R_2$: H, the methyl, ethyl, n-propyl, isopropyl, n-butyl, sec.-butyl, n-hexyl, n-octyl, n-dodecyl, allyl, α-methallyl, prop-2-inyl, benzyl, α-methyl benzyl, α-naphthyl methyl, β-hydroxy ethyl, β-hydroxy propyl or β-hydroxy phenyl ethyl group. $R_2$ preferably represents hydrogen or a straight-chain or branched alkyl radical having 1 to 4 carbon atoms, H and the methyl group being particularly preferred.

Examples of the radicals $R_3$ and $R_4$ include methyl, ethyl, n-propyl, isopropyl, n-butyl, sec.-butyl, n-hexyl, n-octyl and n-dodecyl, but preferably alkyl radicals having 1 to 4 carbon atoms. Methyl radicals are particularly preferred.

The following are examples of $R_3$ and $R_4$ which form a cycloalkyl ring with the ring carbon atom to which they are attached: spirocyclopentyl, spirocyclohexyl, methyl spirocyclohexyl, spirocycloheptyl and spirocyclododecyl, preferably spirocyclohexyl.

The following are examples of formula (I) compounds according to the invention:

4-[Δ²-1,3-thiazolinylamino]-2,2,6,6-tetramethyl piperidine

4-[Δ²-1,3-thiazolinylamino]-1,2,2,6,6-pentamethyl piperidine

4-[Δ²-1,3-thiazolinyl-benzylamino]-2,2,6,6-tetramethyl piperidine

4-[4'-methyl-Δ²-1,3-thiazolinylamino]-2,2,6,6-tetramethyl piperidine

4-[4'-methyl-Δ²-1,3-thiazolinyl-methylamino]-2,2,6,6-tetramethyl piperidine

4-[4'-methyl-Δ²-1,3-thiazolinyl-phenylamino]-2,2,6,6-tetramethyl piperidine

4-[4',4'-dimethyl-Δ²-1,3-thiazolinylamino]-2,2,6,6-tetramethyl piperidine

4-[4',4'-dimethyl-Δ²-1,3-thiazolinylamino]-1-allyl-2,2,6,6-tetramethyl piperidine 4-[4',4'-dimethyl-Δ²-1,3-thiazolinylamino]-1-aza-2,2-dimethyl spiro-[5,5]-undecane 4-[4',4'-dimethyl-Δ²-1,3-thiazolinyl-octylamino]-2,2,6,6-tetramethyl piperidine 4-[4'-ethyl-Δ²-1,3-thiazolinylamino]-2,2,6,6-tetramethyl piperidine 4-[4'-ethyl-Δ²-1,3-thiazolinyl-cyclohexylamino]-2,2,6,6-tetramethyl piperidine 4-[4'-ethyl-Δ²-1,3-thiazolinyl-methylamino]-1-β-hydroxy ethyl-2,2,6,6-tetramethyl piperidine 4-[4',5'-dimethyl-Δ²-1,3-thiazolinylamino]-2,2,6,6-tetramethyl piperidine 4-[4'-isopropyl-Δ²-1,3-thiazolinylamino]-2,2,6,6-tetramethyl piperidine 4-[4'-isopropyl-Δ²-1,3-thiazolinyl-β-hydroxyethylamino]-2,2,6,6-tetramethyl piperidine 4-[4'-butyl-Δ²-1,3-thiazolinylamino]-2,2,6,6-tetramethyl piperidine 4-[4'-butyl-Δ²-1,3-thiazolinyl-β-cyanoethylamino]-2,2,6,6-tetramethyl piperidine 4-[4'-n-hexyl-Δ²-1,3-thiazolinylamino]-1,2,2,6,6-pentamethyl piperidine 4-[4',4-dimethyl-5'-ethyl-Δ²-1,3-thiazolinylamino]-2,2,6,6-tetramethyl piperidine 4-[4',4',5',5'-tetramethyl-Δ²-1,3-thiazolinylamino]-2,2,6,6-tetramethyl piperidine 4-[5'-chloromethyl-Δ²-1,3-thiazolinylamino]-2,2,6,6-tetramethyl piperidine 4-[5'-chloromethyl-Δ²-1,3-thiazolinylamino]-1-benzyl-2,2,6,6-tetramethyl piperidine 4-[5'-α,β-dichloroethyl-Δ²-1,3-thiazolinylamino]-2,2,6,6-tetramethyl piperidine 4-[hexahydro-Δ²-benzthiazolylamino]-2,2,6,6-tetramethyl piperidine 4-[hexahydro-Δ²-benzthiazolyl-methylamino]-2,2,6,6-tetramethyl piperidine 4-[hexahydro-Δ²-benzthiazolylj-cyclohexylamino]-2,2,6,6-tetramethyl piperidine.

The present invention also relates to the production of compounds corresponding to general formula (I) by reacting β-chloroisothiocyanates (III) with 4-aminopiperidines (IV). The reaction may be illustrated by the following general formula scheme:

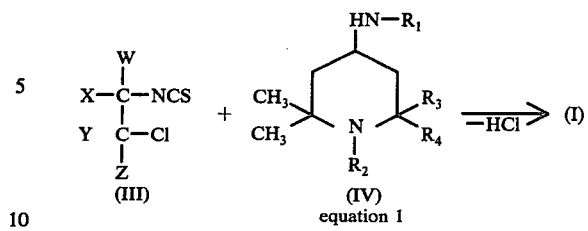

equation 1

In these formulae, the radicals W, X, Y, Z, R₁, R₂, R₃ and R₄ are as defined above.

The β-chloroisothiocyanates (III) used as starting materials may readily be obtained by known methods from β-chloroisocyanide dichlorides, for example by reaction with sodium sulphide or with phosphorus pentasulphide (DT-PS 1,174,772). For their part the β-chloroisocyanide dichlorides are known and are produced from olefins, chlorine and cyanogen chloride (Synthesis 1970, 20).

The β-chloroisothiocyanates of formula (III) used for the reaction according to the invention as represented by equation 1 include 1-chloro-2-isothiocyanatoethane, 1-chloro-2-isothiocyanatopropane, 1-chloro-2-isothiocyanatobutane, 1-chloro-2-isothiocyanato-2-methyl propane, 1-isothiocyanato-2,3,4-trichlorobutane, 1-isothiocyanato-2,3-dichloropropane, 2-isothiocyanato-3-chloro-3-methyl butane, 2-isothiocyanato-1-chloro-2,3-dimethyl butane, 2-isothiocyanato-1-chloro-2,4,4-trimethyl pentane, 3-isothiocyanato-2-chloro-2,4,4-trimethyl pentane 2-isothiocyanato-1-chloro-2,4,4,6,6-pentamethyl heptane, 1-isothiocyanato-2-chlorocyclopentane, 1-isothiocyanato-2-chlorocyclohexane, 1-isothiocyanato-2-chloronorbornane, 1-isothiocyanato-2-chlorocyclooctane and 1-isothiocyanato-2-chlorocyclododecane.

The reaction according to the invention of the β-chloroisothiocyanates (III) with the known 4-aminopiperidine derivatives (IV) is preferably carried out by initially mixing the reaction components at room temperature either in the absence of a solvent or in an inert organic solvent and then carrying out the thiazoline-forming reaction at elevated temperature, optionally in the presence of water, this reaction being accompanied by the elimination of hydrogen chloride.

The reaction components may be added in any order. Generally from 0.3 to 2 moles, preferably from 0.9 to 1.7 moles, and with particular preference, 1 mole of the 4-aminopiperidine may be reacted per mole of the β-chloroisothiocyanate.

At the beginning of the reaction, when the reactants are mixed, the reaction temperature is generally in the range of from 0° to 100° C, preferably in the range of from 0° to 60° C and, with particular preference, in the range of from 20° to 30° C. Ring closure by which the thiazoline is formed takes place at temperatures generally in the range of from 50° to 150° C and preferably at temperatures in the range of from 70° to 120° C.

Examples of suitable inert organic solvents for the reaction according to the invention are hydrocarbons, such as petroleum ether, pentane, cyclohexane, benzene, toluene, xylene, etc.; also chlorinated compounds such as methylene chloride, chloroform, carbon tetrachloride, chlorobenzene or o-dichlorobenzene. It is also possible to use ethers such as, for example, diisopropyl ether, dioxane, tetrahydrofuran, dimethoxy ethane, etc.

Toluene, dioxane and tetrahydrofuran are particularly preferred.

In order to accelerate the reaction, it can be advantageous to add basic compounds to the reaction mixture. It is preferred to use one equivalent of the base per mole of β-chloroisothiocyanate, although it is also possible to use the base in a deficit.

Examples of suitable bases are hydroxides, carbonates and oxides of the alkali and alkaline earth metals, also tertiary amines such as, for example, trimethylamine, triethylamine, N,N-dimethyl benzylamine, pyridine etc. Sodium hydroxide and trialkylamines are particularly preferred.

In general, the reaction is carried out under normal pressure, although it may also be carried out under reduced pressure or under elevated pressure. It can be particularly advantageous to carry out the reaction at elevated pressures of up to about 10 bars, more especially up to about 2 bars, in order to obtain a higher reaction velocity and a shorter reaction time.

The reaction according to the invention may, of course, also be carried out continuously, for example in a tubular reactor, in a cascade of reaction vessels or in any other apparatus of the type commonly used for continuous processes.

The present invention also relates to the use of the compounds as stabilisers against the degradation of synthetic polymers, and to the polymers thus stabilised.

The expression "synthetic polymers" covers the following products among others: polyurethanes, polyethylene oxide polymers, polypropylene oxide polymers, polyepoxide polymers, polyamides, for example nylon 4, nylon 6, nylon 11, nylon 12, nylon 6,6, nylon 6,10 or copolyamides of the above components; aromatic polyamides of, for example, isophthalic and terephthalic acid, m-phenylene diamine and/or p-phenylene diamine; polyesters such as polyethylene terephthalate, polybutylene terephthalate or segmented copolyether esters of dihydroxy polytetramethylene oxide, terephthalic acid/isophthalic acid ethylene glycol/1,4-butane diol or 1,4-cyclohexane diol; polycarbonates; polyimides; plastic materials based on cellulose such as, for example, cellulose acetate, cellulose butyrate or polyacetals such as polyoxy methylene; polyolefins such as polyethylene of low and high density; polypropylene, polystyrene, polybutadiene, polyisoprene, polypentenamers, polyacrylonitrile, also homopolymers of other olefins and copolymers such as ethylene/propylene copolymers, ethylene/propylene diene copolymers, ethylene/butylene copolymers, ethylene/vinyl acetate copolymers, styrene/butadiene copolymers, styrene/acrylonitrile copolymers, acrylonitrile/butadiene/styrene copolymers; polyvinyl chloride and polyvinylidene chloride; copolymers of vinyl chloride with vinylidene chloride and copolymers of vinyl chloride and vinylidene chloride with vinyl acetate and other olefins, such as acrylonitrile for example; and unsaturated polyester resins.

One particularly important group of polymers to be stabilised are the elastic polyurethanes which may optionally be present in foamed form and which may be produced by methods known per se from the known starting materials. The polyurethanes are generally obtained by reacting relatively high molecular weight polyhydroxyl compounds (for example polyesters or polyethers with a molecular weight of about 500 to 5000, having melting points preferably below 60° C) and aliphatic, araliphatic or aromatic polyisocyanates (preferably aromatic diisocyanates, such as tolylene diisocyanate or diphenyl methane-4,4′-diisocyanate), also so-called chain-extending agents, i.e. low molecular weight compounds (molecular weight for example 18 to 400) containing two or more isocyanate-reactive groups (for example water, low molecular weight diols, diamines, dihydrazides or similar compounds, such as for example aminoalcohols, aminohydrazides, hydroxy hydrazides, aminosemicarbazides, semicarbazide hydrazides, semicarbazide carbazinic esters or corresponding mixtures of these chain-extending agents produced in one or several stages either in the melt or in solvents by a number of known and modifiable processes.

The following are mentioned as examples of starting materials for the above-mentioned polyurethanes: polyesters of adipic acid and dialcohols having from 2 to about 10 carbon atoms, preferably those with more than 5 carbon atoms, the dialcohols also being useable for lowering the melting points of the polyesters in the mixture; polyesters of caprolactone and dialcohols, also polyalkylene ether diols, especially polytetramethylene ether diols, polytrimethylene ether diols, polypropylene glycol or corresponding copolyethers. Preferred diisocyanates are aromatic diisocyanates such as diphenyl methane-4,4′-diisocyanate, tolylene diisocyanate, araliphatic diisocyanates such as m-xylene diisocyanate or even aliphatic diisocyanates, such as hexamethylene diisocyanate and dicyclohexyl methane-4,4′-diisocyanate. These starting materials are reacted, optionally with additional dialcohols, to form NCO-preadducts which preferably have the structures indicated in Belgian Patent Specification No. 734,194. Suitable chain-extending agents, which may optionally be used in admixture or in a multi-stage reaction, are water and/or dialcohols or trialcohols, such as butane diol and p-xylylene glycols, trimethylol propane, aminoalcohols such as ethanolamine, diamines such as diphenyl methane-4,4′-diamine, 3,3′-dichlorodiphenyl methane-4,4′-diamine, but preferably aliphatic diamines such as ethylene diamine, 1,2-propylene diamine, isophorone diamine, metaxylylene diamine and hydrazine or dihydrazines, such as carbodihydrazide, oxalic acid dihydrazide, glutaric acid dihydrazide, pimelic acid dihydrazide, terephthalic acid dihydrazide, β-alanyl hydrazide or semicarbazide hydrazides, such as β-semicarbazide alanyl hydrazide.

It is preferred to stabilise polyurethanes which, in addition to urethane groups, also contain —NH—CO—NH—groups formed by the reaction of isocyanate groups with water and/or compounds containing terminal NH$_2$—groups (for example diamines, dihydrazides, carbodihydrazide, semicarbazide hydrazides or hydrazine) and which have a substantially linear, segmented molecular structure, are soluble in hightly polar solvents, such as dimethyl formamide or dimethyl acetamide, before they are formed or shaped and of which the characteristic segments may be characterised by the following formula moiety:

This segment may be formed from the reaction of an NCO-preadduct OCN.Y.NCO with a chain-extending agent H$_2$N.X.NH$_2$.

The radical —Y— of the NCO-preadduct may be built up, for example, as follows:

R.NH.CO.O.D.O.CO.NH.R.

or may have any other conventional composition (cf. Belgian Patent Specification No. 734,194).

In the above formula, R represents a difunctional aliphatic, araliphatic or aromatic radical (of a diisocyanate). D represents the radical of a relatively high molecular weight polyhydroxyl compound with a molecular weight in the range of from 500 to 5000 and with a melting point of below 60° C, without its terminal hydroxyl groups (for example the radical of a polyalkylene ether, polyester, polyacetal or poly-N-alkyl urethane). X is the radical of a difunctional chain extender containing terminal $NH_2$—groups without the terminal $NH_2$—groups, for example an aliphatic, araliphatic, aromatic or heterocyclic radical, an —HN—CO—alkylene—CO—NH—radical, an —NH—CO—N-H—$(CH_2)_2$—CO—NH—radical or a bond between two N-atoms. The synthesis of polyurethane (ureas) of this type is described in detail, for example, in German Auslegeschrift No. 1,270,276 and in Belgian Patent Specification No. 734,194. Polyurethane foams can be produced, for example with the stabilisers added to the starting components (for example polyethers), by known methods and according to known recipes (cf. for example Kunststoff-Handbuch, Vol. VII, Polyurethane, Carl Hanser Verlag Munich, 1966, pages 440 to 457, 504 to 531).

The stabilisers according to the invention are used in particular for stabilising synthetic polymers against discoloration and degradation under the effect of visible and/or UV-light, heat and/or atmospheric influences such as oxygen, oxides of nitrogen, chlorine and exhaust combustion gases.

The compounds of general formula (I) used as stabilisers in accordance with the invention may readily be incorporated into the synthetic polymer by any of the standard processes for compounding additives in a polymer. For example, the liquid, molten or solid powder-form stabiliser may be mixed with the synthetic polymer or may be mixed in the form of a solution, suspension or emulsion with a melt, solution, suspension or emulsion of the synthetic polymer. Mixing may optionally be carried out during the actual preparation of the polymer. In the case of filaments, the stabiliser may even be applied to the surface in the form of a melt of the preparation or may be incorporated during wet spinning from the coagulation bath with the filaments in gel form.

The quantity in which the stabiliser is used in accordance with the invention is governed by the type and the particular application of the polymer and may be left to the discretion of the average expert. In general, the stabiliser is used in a quantity of from 0.01 to 5% by weight, preferably in a quantity of from 0.05 to 3.5% by weight and, with particular preference, in a quantity of from 0.05 to 2.5% by weight, based on the quantity of the polymer.

In addition to the stabilisers according to the invention, other known additives may be incorporated in the polymer. Additives such as these include antioxidants of the sterically hindered phenol type such as, for example, 2,6-di-tert.-butyl-p-cresol; 4,4'-thiobis-(6-tert.-butyl-3-methyl phenol); 2,2'-thiobis-(6-tert.-butyl-4-methyl phenol); α,α'-bis-(2-hydroxy-3,5-dialkyl phenyl)-p-diisopropyl benzenes; α,α'-bis-(2-hydroxy-3,5-dialkyl phenyl)-m-diisopropyl benzenes; 2,2'-methylene-bis-(4-methyl-6-tert.-butyl phenol); 2,2'-methylene-bis-(4-methyl-6-cyclohexyl phenol); 1,1,3-tris-(5-tert.-butyl-4-hydroxy-2-methyl phenyl)-butane; tetrakis-(3,5-di-tert.-butyl-4-hydroxyphenyl propionyl oxymethyl)-methane; also compounds of the divalent sulphur type, such as for example dilauryl thiodipropionate; compounds of the trivalent phosphorus type such as, for example, triphenyl phosphite, tris-(p-nonyl phenyl)-phosphite; also UV-absorbers based on 2-(2'-hydroxyphenyl)-benzotriazole such as, for example, 2-(2'-hydroxy-5'-methyl phenyl)-benzotriazole, 2-(3',5'-di-tert.-butyl-2'-hydroxyphenyl)-5-chlorobenzotriazole; or even UV-absorbers based on benzophenone such as, for example, 2-hydroxy-4-octoxy benzophenone; 2',4'-di-tert.-butyl phenyl-3,5-di-tert.-butyl-4-hydroxy benzoate; cyanoacrylic acid esters such as, for example α-cyano-β-methyl-β-(p-methoxyphenyl)-acrylate and other light stabilisers such as, for example, 2,2'-thiobis-(4-tert.-octyl phenolate)-n-butylamine nickel.

It is even possible to use two or more of the thiazolinylamino-piperidines according to the invention at the same time as stabilisers.

The object of the following Examples is merely to illustrate the invention. The structures of the compounds are clearly identified by their nuclear resonance and mass spectra. $M^+$ is the abbreviation for the mass of the mol ion in the mass spectrum. All parts and percentages are by weight unless otherwise indicated.

EXAMPLE 1

4-[Hexahydro-$\Delta^2$-benzthiazolyl-methylamino]-2,2,6,6-tetramethyl piperidine 35.1 g (0.2 mole) of β-chlorocyclohexyl isothiocyanate (b.p.$_{15}$ 142° C) are dissolved in 250 ml of dioxane, followed by the dropwise addition at room temperature of 33.6 g (0.2 mole) of 4-N-methyl-2,2,6,6-tetramethyl piperidine. After stirring for 2 hours, followed by filtration, the solid is suspended in 300 ml of water. Following the dropwise addition of 20 g of triethylamine, the mixture is boiled under reflux for 2 hours, left to cool and extracted with ether. The ether phase is dried and ether and excess triethylamine are distilled off under reduced pressure, leaving behind a yellowish oil. Yield: 48 g (80% of the theoretical). $C_{17}H_{31}N_3S$ (309.53) observed $M^+$ 309.

EXAMPLE 2

4-[Hexahydro-$\Delta^2$-benzthiazolylamino]-2,2,6,6-tetramethyl piperidine 35.1 g (0.2 mole) of β-chlorocyclohexyl isothiocyanate are dissolved in 250 ml of toluene, followed by the dropwise addition at room temperature of 31.2 g (0.2 mole) of 4-amino-2,2,6,6-tetramethyl piperidine. The toluene is evaporated off in vacuo and the oily residue is heated for 2 to 3 hours to 70° – 80° C. Ring closure to form the thiazoline takes place with evolution of hydrogen chloride. The crude product melts at 106° C and, after recrystallisation from acetonitrile, at 111° to 112° C. $C_{16}H_{29}N_3S$ (295.50) observed $M^+$ 295.

EXAMPLE 3

4-[4',4'-Dimethyl-$\Delta^2$-1,3-thiazolinylamino]-2,2,6,6-tetramethyl piperidine 15 g (0.1 mole) of 1-methyl-1-chloromethyl ethyl isothiocyanate (b.p.$_{11}$ 75° – 78° C) are dissolved in 100 ml of dioxane. 15.6 g (0.1 mole) of 4-amino-2,2,6,6-tetramethyl piperidine are added dropwise at room temperature, followed by stirring for 3 hours. After filtration and suspension in 200 ml of water, 10.1 g of triethylamine are added and the mixture is boiled under reflux for 2 hours. After cooling, the mixture is filtered, giving 25.5 g (91% of the theoretical) of a white crystalline powder melting at 89° – 91° C. $C_{14}H_{27}N_3S$ (269.46) observed $M^+$ 269.

EXAMPLE 4

4-[5'-α,β-Dichloroethyl-Δ²-1,3-thiazolinylamino]-2,2,6,6-tetramethyl piperidine 21.3 g (0.1 mole) of 2,3,4-trichlorobutyl isothiocyanate (b.p. $_{0.8}$ 130° – 136° C) are dissolved in 100 ml of dioxane, followed by the dropwise addition of 15.6 g (0.1 mole) of 4-amino-2,2,6,6-tetramethyl piperidine in 100 ml of dioxane. The temperature is kept at room temperature by cooling. After the addition of 100 ml of 1 N sodium hydroxide, the mixture is boiled under reflux for 2 to 3 hours, extracted by shaking with methylene chloride, dried and concentrated by evaporation to dryness. The residue is recrystallised from acetonitrile, giving 11.5 g (34% of the theoretical) of the thiazolinylamino-piperidine melting at 164° to 166° C. $C_{14}H_{25}Cl_2N_3S$ (338.36) observed $M^+$ 337 for 35 Cl.

EXAMPLE 5

4-[4'-Ethyl-Δ²-1,3-thiazolinylamino]-2,2,6,6-tetramethyl piperidine

4-[4'-ethyl-Δ²-1,3-thiazolinylamino]-2,2,6,6-tetramethyl piperidine is obtained in the same way as in Example 4 from 1-chloro-2-isothiocyanatobutane (b.p. $_{12}$ 85° – 95° C) and 4-amino-2,2,6,6-tetramethyl piperidine in the form of colourless crystals melting at 68° to 70° C. $C_{14}H_{27}N_3S$ (269.46) observed $M^+$ 269.

EXAMPLE 6

4-[Hexahydro-Δ²-benzthiazolyl-cyclohexylamino]-2,2,6,6-tetramethyl piperidine 35.1 g (0.2 mole) of β-chlorocyclohexyl isothiocyanate are dissolved in 250 ml of toluene, followed by the dropwise addition at room temperature of 47.6 g (0.2 mole) of 4-N-cyclohexyl-2,2,6,6-tetramethyl piperidine in 100 ml of toluene. After stirring for 2 hours, 20.2 g (0.2 mole) of triethylamine are added dropwise, followed by boiling under reflux for 2 hours. After cooling, 200 ml of water are added, the organic phase is separated off, the toluene is distilled off in vacuo and the solid left behind is recrystallised from acetonitrile. Melting point: 116° – 118° C. Yield: 69 g (92.5% of the theoretical). $C_{22}H_{39}N_3S$ (377.6) observed $M^+$ 377.

EXAMPLE 7

4-[Hexahydro-Δ²-benzothiazolyl-benzylamino]-2,2,6,6-tetramethyl piperidine 75 g (98% of the theoretical) of 4-[hexahydro-Δ²-benzothiazolyl-benzylamino]-2,2,6,6-tetramethyl piperidine, in the form of a yellow oil, are obtained as in Example 6 from 0.2 mole of 4-N-benzyl-2,2,6,6-tetramethyl piperidine. $n_{20}^D = 1.5569$ $C_{23}H_{35}N_3S$ (385.6) observed $M^+$ 385.

EXAMPLE 8 a. Procedure for producing the polyurethane to be stabilised 1000 parts of an adipic acid/1,6-hexane diol/2,2-dimethyl-1,3-propane diol mixed polyester (molar ratio of the glycols 65:35) with a molecular weight of 1860 are mixed with 19.8 parts of N-methyl-bis-(β-hydroxypropyl)-amine, 280.7 parts of diphenyl methane-4,4'-diisocyanate and 328 parts of dimethyl formamide, and the resulting mixture is heated for 72 minutes to 45° – 50° C. After cooling to room temperature, the NCO-prepolymer formed has an NCO-content of 2.92%, based on the solids.

748 parts of this prepolymer solution are introduced with stirring into a solution of 33.7 parts of $N_2H.NH.CO.NH.CH_2.CH_2.CO.NH.NH_2$ in 67 parts of water and 1570 parts of dimethyl formamide. The homogeneous viscous solution is pigmented with 4% of rutile, based on the solids, and has a viscosity of 440 poises at 25° C.

b. Measurement of the stabilising effect using elastomer films and (cut) filaments The stabilisers and comparison substances are added (in the form of a concentrated solution in dimethyl formamide) to the elastomer solutions in the quantities specified, followed by stirring for the purposes of homogenisation, after which the solutions are processed into the shaped articles.

The solutions are preferably coated onto glass plates in layer thicknesses of about 0.2 mm and dried in a drying cabinet at 70° to 100° C to form films.

In a screening test the films are cut into approximately 1 cm wide strips and exposed to light in a Fadeometer (assessment of discoloration and the qualitative behaviour of degradation on exposure to light).

The films are preferably cut in a film cutting machine into rectangular filaments with an overall denier of about 200 to 300 dtex and exposed to light in the form of these cut filaments. On account of the large surface of the filaments, the damage caused by the action of light is more intensive and substantially equivalent to the behaviour of filaments spun on an industrial scale. The solutions can also be wet-spun or dry-spun.

c. Stabiliser additions and stabilising effect

The specified quantities of stabiliser are added to the polyurethane (urea) elastomer solutions (a), the solutions are dried to form films and the films, after cutting into filaments, are exposed to light in a Fadeometer (cf. Table) and (in some cases) tested for tensile strength, elongation at break and discoloration (cf. Table 1).

The elastomer solutions containing 2% of stabiliser 2) were processed into elastomer filaments both by the dry spinning process and by the wet spinning process. These filaments showed substantially the same stabilisation to discoloration and approximately the same half lives of their tensile strength values after exposure to UV-light as the filaments cut from films.

The stabilising additives have a distinct stabilising effect against deterioration of tensile strength, against reduction in elongation at break and, in particular, against discoloration under the effect of light.

Table 1

Tensile strength/elongation at break and discoloration of cut filaments of (approximately 300 dtex) PU-elastomers with and without additions of stabiliser

| Stabiliser according to Example No. x) | Quantity of stabiliser added (based on solids) % | Tensile strength/elongation at break (cN/dtex)/ (%) and discoloration after Fadeometer testing at | | | | |
|---|---|---|---|---|---|---|
| | | 0 | 22 | 44 | 66 | 88 hours |
| (Comparison) | - none - | 0.53/620 colourless | 0.37/525 yellowish-yellow | 0.22/436 yellow | n.m. yellow-brown | n.m. yellow-brown |
| 2 | 2.0 | 0.56/656 colourless | 0.41/600 colourless | 0.35/550 almost colourless | 0.29/520 almost colourless to yellowish | 0.26/450 yellow |
| 2 | 1.0 | colourless | colourless | almost colourless | yellowish | yellow |
| 2 | 0.3 | colourless | colourless | yellowish | yellowish | yellow |
| 1 | 2.0 | n.g. colourless | 0.43/535 colourless | 0.37/525 almost colourless | 0.24/440 yellowish | 0.12/250 yellow |
| 3 | 2.0 | n.g. colourless | 0.40/525 colourless | 0.37/530 almost colourless | 0.26/520 almost colourless to yellowish | 0.24/420 yellowish |
| 5 | 2.0 | colourless | colourless | almost colourless | yellowish | yellow | n.g. = not measured
n.m. = cannot be measured; tensile strength below 0.1 cN/dtex; elongation at break below 200 %.

The half lives of the tensile strength values after exposure to light are considerably improved by the stablising additives (approximately 100 to 150% improvement; from about 30 to about 80 Fadeometer hours). The other elastic properties, such as elongation at break, modulus and permanent elongation, are retained considerably more satisfactorily. The surfaces of the polyurethane films and coatings remain elastic on elongation, whereas, in the case of the films with considerably reduced tensile strength, they develop a crazed surface structure.

Another surprising aspect of the stabilising additives is their effectiveness even when added in small quantities. In quantities upwards of about 0.3%, they have a distinct stabilising effect which is improved relatively little in regard to discoloration by increasing the quantity added.

Combination with other types of antioxidants, for example phenolic types, affords certain advantages, although the influence of the stabilisers according to the invention generally predominates.

However, the particular effectiveness of the stabilisers is not confined solely to this tetramethyl piperidine radical. Instead it is decisively modified by the overall constitution of the stabiliser. This is illustrated in the comparison tests, summarised in Table 3, where similar known compounds (cf. Table 2) have a very much weaker effect. The particular effectiveness of the stabilisers according to the invention could not be derived therefrom.

Table 2

Comparison substances:

A 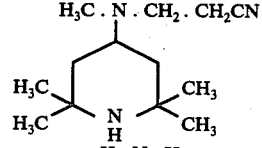 according to FR-PS 1,360,030 US-PS 3,334,103 FR-PS 1,526,656

B 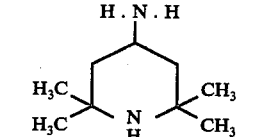 according to DT-OS 2,349,962

Table 2-continued

Comparison substances:

C 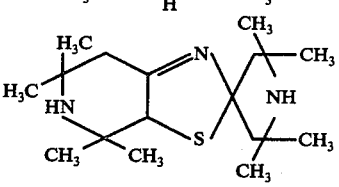 according to DT-OS 2,349,962

D 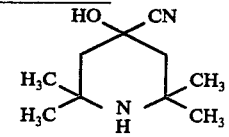 according to US-PS 3,147,268 NL-OS 7,313,683

E 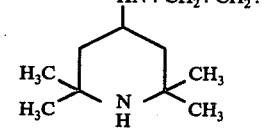 according to DT-AS 2,253,503

The stabilising effects of these substances in the polyurethane according to Example 8 a) are shown in Table 3:

Table 3

Tensile strength/elongation at break and discoloration of cut filaments of PU-elastomers using partly known compounds of the tetramethyl piperidine series (Comparison tests)

| Comparison substance | Quantity (%) | Tensile strength/elongation at break and discoloration (cN/dtex) (%) after Fadeometer testing for | | | | |
|---|---|---|---|---|---|---|
| | | 0 | 22 | 44 | 66 | 88 hours |
| A | 2.0 | 0.56/665 colourless | 0.28/490 yellowish | 0.18/422 yellow | yellow-brown | brown-yellow |
| B | 2.0 | colourless | yellow | yellow-brown | yellow-brown | brown-yellow |
| C | 2.0 | colourless | almost colourless | yellow | yellow-brown | brown-yellow |
| D | 2.0 | colourless | yellowish | yellow | yellow-brown | brown-yellow |
| E | 2.0 in polyurethane | — | yellowish | bright yellow | yellow-brown | brown |

Table 3-continued

Tensile strength/elongation at break and discoloration of cut filaments of PU-elastomers using partly known compounds of the tetramethyl piperidine series
(Comparison tests)

| Comparison substance | Quantity (%) | Tensile strength/elongation at break and discoloration (cN/dtex) (%) after Fadeometer testing for | | | |
|---|---|---|---|---|---|
| | | 0 | 22 | 44 | 66 | 88 hours |
| E | 8a 2.0 in polyurethane 9 | — | bright yellow | yellow-brown | brown | brown |

As the results show, there is little or no improvement in resistance to degradation or in reduction of discoloration in the polyurethanes. The stabilisers according to the invention have a considerably better stabilising effect.

Stabiliser E (according to DT-AS 2,252,503) has no stabilising effect, but instead produces much more yellowing and accelerated deterioration of tensile strength, both in the polyurethanes according to Example 8a and also in the polyurethanes according to Example 9.

EXAMPLE 9 a. Procedure for producing the polyurethane to be stabilised 718 parts of the NCO-prepolymer described in Example 10 are stirred into a carbamate suspension formed by adding 25 parts of solid carbon dioxide to a solution of 12.68 parts of ethylene diamine (99%) in 1578 parts of dimethyl formamide. A highly viscous solution (viscosity approximately 210 poises) is obtained after pigmenting with 4% of rutile.

b. Stabilising the polyurethane

2% of each of the stabilisers according to Examples 1 to 3 are incorporated in the solutions of the PU-elastomer 11a). Films are cast therefrom, cut into filaments (denier approximately 300 den) and tested in a Fadeometer for 0, 22, 44 and 66 hours.

Testing the tensile strength of the filaments by comparison with non-stabilised polyurethane (urea) elastomers produced the following percentage improvement in the half life of the tensile strength values after exposure to

| Percentage improvement in half life of tensile strength on exposure to UV-light. | |
|---|---|
| without stabiliser | 0 |
| 2 % of stabiliser according to Example 1 | +110 % |
| 2 % of stabiliser according to Example 2 | +260 % |
| 2 % of stabiliser according to Example 3 | +110 % |

EXAMPLE 10

400 parts of a polytetramethylene ether diol with a molecular weight of 1045 (POLYMEG 1000, a product of the Quaker Oats Company) are reacted with a solution of 140.8 parts of diphenyl methane-4,4'-diisocyanate and 135 parts of dimethyl formamide at 50° C until the NCO-content amounts to 3.2%, based on the solids content of the prepolymer solution.

6.02 parts of hydrazine hydrate are dissolved in 898 parts of dimethyl formamide, and a carbonate suspension of the hydrazine is formed by adding 10 parts of solid carbon dioxide. The suspension thus formed is reacted by stirring in 430 parts of the above NCO-prepolymer solution to form the segmented linear polyurethane. The homogeneous, viscous elastomer solution (51 poises/20° C) is pigmented with a $TiO_2$-suspension (4% of $TiO_2$/rutile based on elastomer solids).

The solution is cast into elastomer films both with and without (comparison test) additions of stabiliser.

The elastomer films thus produced are Fadeometer tested in the form of strips (for results, see Table 4). The results show that the unstabilised polyether urethane yellows very quickly and has been degraded after only 22 hours in the Fadeometer (no more strength, surface of the film "crackles" under minimal elongation).

Table 4

| | Fadeometer testing of film strips | | | | |
|---|---|---|---|---|---|
| | after 22 hours | 44 hours | 66 hours | 88 hours | 156 hours |
| without stabiliser | yellow, films have no strength and are "crackled". Substantially degraded strength | yellow (brown) Films without strength, totally degraded | yellow-brown | Films without strength, totally degraded | totally degraded |
| + 2 % by weight of stabiliser according to Example 2 | colourless strength substantially intact | colourless strength substantially intact, no "crackling", fully elastic | colourless | colourless, fully elastic | colourless fully elastic |

EXAMPLE 11

A 12% solution of a copolyamide (produced by the polycondensation of 50 parts by weight of caprolactam, 35 parts by weight of 1,6-hexamethylene diammonium adipate and 20 parts by weight of 1,6-hexamethylene diammonium sebacate) in 85 parts by weight of methanol, 6 parts by weight of isopropanol, 4.5 parts by weight of isobutanol and 4.5 parts by weight of water is dried into a film approximately 0.10 mm thick.

a. without an addition of stabiliser,
b. with 2% by weight of the stabiliser according to Example 3, followed by Fadeometer testing for 275 hours.

The unstabilised copolyamide (a) turns brittle and breaks when the film is bent, whereas the stabilised film (b) remains flexible.

We claim:

1. Thiazolinylamino-piperidine compounds corresponding to the general formula (I):

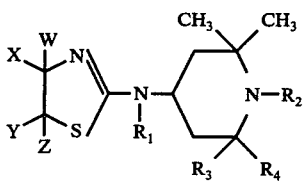

in which
- the radicals W, X, Y and Z are the same or different and each represent H, a straight-chain or branched alkyl radical having 1 to 12 carbon atoms which may optionally be substituted by 1 to 3 chlorine atoms, in addition to which the radicals X and Y may also form with the carbon atoms in the 4- and 5-positions of the thiazoline ring, a cycloalkyl ring having 5 to 8 or 12 ring carbon atoms.,
- $R_1$ represents H, a straight-chain or branched alkyl radical having 1 to 20 carbon atoms, a cycloalkyl radical having 5 to 12 carbon atoms, an aralkyl radical having 7 to 12 carbon atoms, a β-cyanoethyl radical, a β-alkoxy carbonyl ethyl radical having 1 to 3 carbon atoms in the alkoxy moiety, an aryl radical having 6 to 14 carbon atoms, the group $-CH_2-CHR_5-OH$ where $R_5$ represents H, methyl or phenyl, or corresponds to the formula (II):

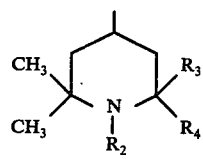

in which $R_2$ represents H, a straight-chain or branched alkyl radical having 1 to 20 carbon atoms, an alkenyl or alkynyl radical having 3 to 12 carbon atoms, an aralkyl radical having 7 to 12 carbon atoms or the $-CH_2-CHR_5-OH$ where $R_5$ represents H, methyl or phenyl, and, $R_3$ and $R_4$ are the same or different and each represent a straight-chain or branched alkyl radical having 1 to 12 carbon atoms or, together with the ring carbon atom to which they are attached, form a cycloalkyl ring having 5 to 12 carbon atoms, and $R_2$, $R_3$ and $R_4$ in formula (I) have the same meaning as $R_2$, $R_3$ and $R_4$ in formula (II).

2. Thiazolinylamino-piperidine compounds as claimed in claim 1 in which

W, X, Y and Z are the same or different and each represent an alkyl radical having 1 to 4 carbon atoms which may optionally contain 1 or 2 chlorine atoms, in addition to which X and Y may together form a cyclohexane, methyl cyclohexane or norbornane ring, $R_1$ represents H, a straight-chain or branched alkyl radical having 1 to 8 carbon atoms, cyclohexyl, methyl cyclohexyl, benzyl, β-cyanoethyl, 2-methoxy carbonyl ethyl or β-hydroxy ethyl, $R_2$ represent H, a straight-chain or branched alkyl radical having 1 to 4 carbon atoms, and $R_3$ and $R_4$ are the same or different and each represent an alkyl radical having 1 to 4 carbon atoms or together form a cyclohexyl ring.

3. Thiazolinylamino-piperidine compounds as claimed in claim 1 in which

W, X, Y and Z are the same or different and each represent methyl, ethyl, propyl, chloromethyl or α,β-dichloroethyl radicals, in addition to which X and Y together may form a cyclohexane ring, $R_1$ represents H, methyl, cyclohexyl, benzyl, β-cyanoethyl or β-hydroxyethyl, $R_2$ represents H and methyl and $R_3$ and $R_4$ represent methyl.

4. A process for the production of thiazolinylaminopiperidine compounds of the kind claimed in claims 1 to 3, wherein β-chloroisothiocyanates corresponding to the formula (III):

in which the radicals W, X, Y and Z are the same or different and each represent H, a straight-chain or branched alkyl radical having 1 to 12 carbon atoms which may optionally be substituted by 1 to 3 chlorine atoms, in addition to which the radicals X and Y may together form a cycloalkyl ring having 5 to 8 or 12 ring carbon atoms, are mixed at 0° to 100° C with 4-aminopiperidine derivatives corresponding to the formula (IV):

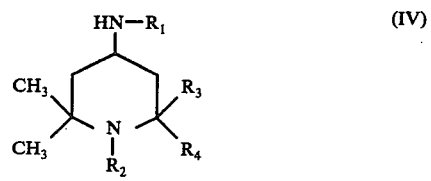

in which
- $R_1$ represents H, a straight-chain or branched alkyl radical having 1 to 20 carbon atoms, a cycloalkyl radical having 5 to 12 carbon atoms, an aralkyl radical having 7 to 12 carbon atoms, a β-cyanoethyl radical, a β-alkoxy carbonyl ethyl radical having 1 to 3 carbon atoms in the alkoxy moiety, an aryl radical having 6 to 14 carbon atoms, the group $-CH_2-CHR_5-OH$ where $R_5$ represents H, methyl or phenyl or corresponds to the formula (II):

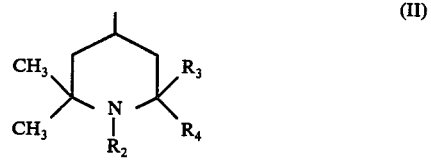

in which $R_2$ represents H, a straight-chain or branched alkyl radical having 1 to 20 carbon atoms, an alkenyl or alkynyl radical having 3 to 12 carbon atoms, an aralkyl radical having 7 to 12 carbon atoms or the group $-CH_2-CHR_5-OH$ where $R_5$ represents H, methyl or phenyl, and $R_3$ and $R_4$ are the same or different and each represent a straight-chain or branched alkyl radical having 1 to 12 carbon atoms or, together with the ring carbon atom to which they are attached, form a cycloalkyl ring having 5 to 12 ring carbon atoms, and $R_2$, $R_3$ and $R_4$ in formula (IV) have the same meaning as $R_2$, $R_3$ and $R_4$ in formula (II), and the ring-closing reaction by which the thiazoline ring is formed is carried out with evolution of hydrogen chloride at temperatures in the range of from 50° to 150° C, from 0.5 to 2 moles of the 4-aminopiperidine being used per mole of β-chloroisothiocyanate.

5. A process as claimed in claim 4, wherein from 0.9 to 1.1 moles of the 4-aminopiperidine derivative are used per mole of the β-chloroisothiocyanate.

6. A process as claimed in claim 4, wherein 1 mole of the 4-aminopiperidine derivative is used per mole of the β-chloroisothiocyanate.

7. A process for stabilising synthetic polymers, wherein the polymers have added to them active quantities of thiazolinylamino-piperidine derivatives corresponding to the formula (I):

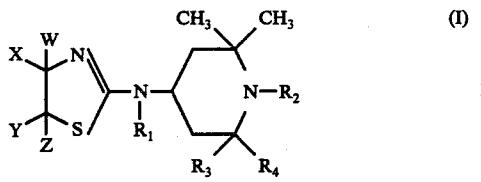

in which
the radicals W, X, Y and Z are the same or different and each represent H, a straight-chain or branched alkyl radical having 1 to 12 carbon atoms which may optionally be substituted by 1 to 3 chlorine atoms, in addition to which the radicals X and Y may also form with the carbon atoms in the 4- and 5-positions of the thiazoline ring a cycloalkyl ring having 5 to 8 or 12 ring carbon atoms, $R_1$ represents H, a straight-chain or branched alkyl radical having 1 to 20 carbon atoms, a cycloalkyl radical having 5 to 12 carbon atoms, an aralkyl radical having 7 to 12 carbon atoms, a β-cyanoethyl radical, a β-alkoxy carbonyl ethyl radical having 1 to 3 carbon atoms in the alkoxy moiety, an aryl radical having 6 to 14 carbon atoms, the group —$CH_2$—$CHR_5$—OH where $R_5$ represents H, methyl or phenyl, or corresponds to the formula (II):

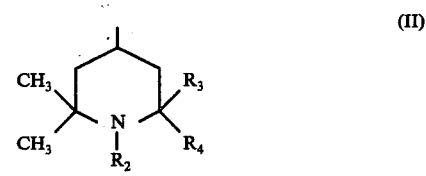

in which $R_2$ represents H, a straight-chain or branched alkyl radical having 1 to 20 carbon atoms, an alkenyl or alkynyl radical having 3 to 12 carbon atoms, an aralkyl radical having 7 to 12 carbon atoms or the group —$CH_2$—$CHR_5$—OH where $R_5$ represents H, methyl or phenyl, and $R_3$ and $R_4$ are the same or different and each represent a straight-chain or branched alkyl radical having 1 to 12 carbon atoms or, together with the ring carbon atom to which they are attached, form a cycloalkyl ring having 5 to 12 ring carbon atoms, and $R_2$, $R_3$ and $R_4$ in formula (I) have the same meaning as $R_2$, $R_3$ and $R_4$ in formula (II).

8. A process as claimed in claim 7, wherein the thiazolinylamino-piperidine derivatives are added in quantities of from 0.01 to 5% by weight, based on the polymer.

9. Synthetic polymers stabilised by the process claimed in claim 7.

* * * * *